United States Patent [19]

Akre

[11] Patent Number: 4,783,954
[45] Date of Patent: Nov. 15, 1988

[54] LAYING OF ELONGATE TELECOMMUNICATIONS TRANSMISSION MEMBERS ONTO SUPPORT MEMBERS

[75] Inventor: Collin A. Akre, Clavet, Canada

[73] Assignee: Northern Telecom Limited, Montreal, Canada

[21] Appl. No.: 102,989

[22] Filed: Sep. 30, 1987

[51] Int. Cl.⁴ .......................... G02B 6/10; G02B 6/16; H01B 13/02
[52] U.S. Cl. .............................. 57/9; 57/6; 57/13; 57/352; 350/96.23
[58] Field of Search ........................ 57/6, 7, 9, 13–18, 57/352, 138; 350/96.23; 156/51–56

[56] References Cited

U.S. PATENT DOCUMENTS

| | | | |
|---|---|---|---|
| 4,154,049 | 5/1979 | King et al. ........................... | 57/352 X |
| 4,195,468 | 4/1980 | King et al. ........................... | 57/9 |
| 4,205,899 | 6/1980 | King et al. ........................... | 57/9 |
| 4,309,864 | 1/1982 | Hulin ................................... | 57/6 |
| 4,384,446 | 5/1983 | Hope et al. .......................... | 57/6 |
| 4,411,130 | 10/1983 | Dubois et al. ....................... | 57/352 |
| 4,483,134 | 11/1984 | McKay et al. ....................... | 57/9 X |
| 4,497,164 | 2/1985 | Dotti et al. .......................... | 57/6 |
| 4,586,327 | 5/1986 | Oestreich ............................. | 57/6 X |
| 4,641,492 | 2/1987 | Glushko et al. ..................... | 57/9 |
| 4,663,926 | 5/1987 | Girandon et al. ................... | 57/9 X |

Primary Examiner—John Petrakes
Attorney, Agent, or Firm—R. J. Austin

[57] ABSTRACT

Laying a transmission member into a groove extending along a support while passing around the support for more than one revolution in one direction and then in the other. The transmission member is fed from a fixed storage position, through a positioning device and to a laying device while being spaced radially from a passline for the support. A shielding tube is provided around the passline downstream from the positioning device whereby the support moves through the tube on its way to the laying head whereas the transmission member twists around the tube as it is being fed, thereby holding it separated from the support before reaching the laying head. Preferably, an alignment device upstream from the laying head aligns the transmission member axially with a guide passage in the laying head. This latter arrangement is particularly useful when the transmission member is a tube containing optical fibers.

8 Claims, 5 Drawing Sheets

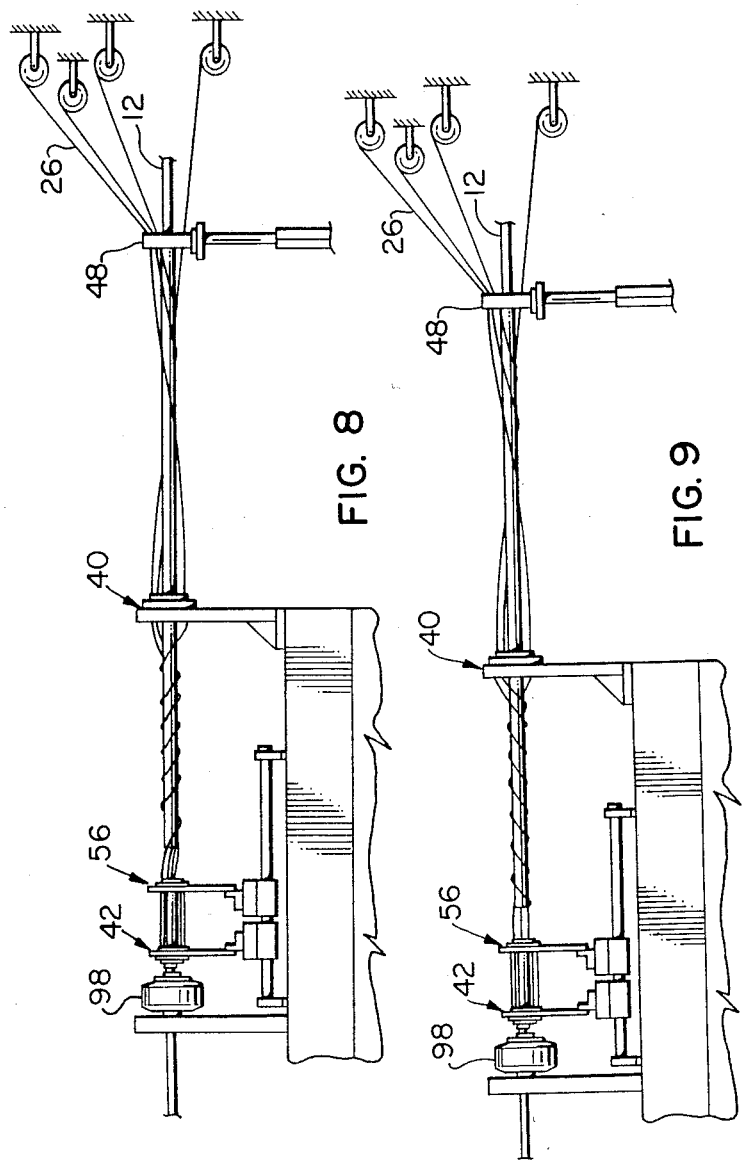

LAYING OF ELONGATE TELECOMMUNICATIONS TRANSMISSION MEMBERS ONTO SUPPORT MEMBERS

This invention relates to the laying of elongate telecommunications transmission members onto support members.

It is known to construct a telecommunications cable having an elongate support formed on its outer surface with one or more grooves which carry elongate telecommunications transmission members. An optical cable is an example of such a telecommunications cable in which optical fibers are carried within grooves of a support member. To enable the cable to be flexed during storage, installation and use while preventing tensions being applied to the fibers, it is common practice for the grooves to extend longitudinally of the cable while lying at an angle to the axis of the support member. In one accepted manner of doing this, the grooves extend in true helical fashion along the support member. In another accepted manner of causing the grooves to lie at an angle to the core axis, the grooves extend along the support member in sinusoidal manner, i.e. one in which the grooves lie at angles to the axis, alternately in one direction around the support member and then in the other. With the sinusoidal arrangement, the grooves normally do not complete a revolution around the support member in either direction.

In the manufacture of optical cables with support members having their grooves extending in true helical fashion, it is common for the optical fibers to be supplied from supply reels located in a storage station, and for these reels to be rotated around the axis of the support member as the fibers are fed into the grooves. This type of arrangement is shown in U.S. Pat. No. 4,309,864 granted Jan. 12, 1982; U.S. Pat. No. 4,382,732, granted May 10, 1983 and U.S. Pat. No. 4,411,130, granted Oct. 25, 1983. In these arrangements as described in the above patent specifications, the apparatus comprises a tube which extends downstream from the storage station in cantilever fashion so as to support a laying head used for directing the fibers into the grooves of the support member. Rotation of the reels for the fibers is synchronously coupled to that of the laying head and is also accompanied by rotation of at least part of the tube extending between the storage station and the laying head. A problem which arises from the use of the apparatus having rotatable fiber storage facilities is that there is a large rotating mass with inertia problems and the design of the apparatus is unduly complex.

With the manufacture of optical cables using the sinusoidal groove arrangement however, the laying head is rotated alternately in one direction and then in the other to lay the fibers into the sinuous grooves with the laying head having an angular movement of less than 360° around the support member, the fiber supply reels may be held in stationary locations without causing any laying problems. Thus, the large rotating mass and its attendant disadvantages are avoided. Apparatus and methods for the production of such cables are described in U.S. Pat. No. 4,205,899 granted June 3, 1980. In the specification for that patent, there is described a commercially used method for producing a grooved support member for supporting fibers in which the grooves extend in sinusoidal fashion. The support member comprises a central metal strength member and a surrounding plastic sheath or sleeve which is formed upon the strength member by extrusion. Other method and apparatus aspects are discussed in U.S. Pat. No. 4,154,049, granted May 15, 1979; 4,195,468, granted Apr. 1, 1980 and 4,248,035 granted Feb. 3, 1981. In all of these patents, it is intended that the sinuous groove arrangement should not extend for more than one complete revolution around the support member because of problems associated with twisting of optical fibers around the support member as they move towards the laying head. Of particular interest are U.S. Pat. Nos. 4,347,697, granted Sept. 7, 1982 and 4,384,446 granted May 24, 1983. Both of these patents are concerned with overcoming problems in laying optical fibers into sinuous grooves of a support member when these grooves extend around the support member for more than a desirable angle. These problems were found in practice even though the sinuous grooves did not extend around the support member for more than one complete revolution.

The problems relating to the location of optical fibers in grooves of a support member apply also to the location of electrical conductors in such grooves, when electrical conductors are also incorporated in an optical cable. In addition, the problems are applicable to a structure in which a telecommunications transmission member comprises an assembly of a tube containing optical fibers such as is described in the U.S. application Ser. No. 27,276 filed Mar. 17, 1987 in the name of K. Abe. In the latter applications, an optical cable is described in which a plurality of ribs provided around a crush resistant central core or support member define between them longitudinally extending grooves and a plurality of tubes are housed within the grooves, each tube containing at least one optical fiber.

The present invention is concerned not only with overcoming the problems associated with laying optical fibers into grooves of a support member, but also in manufacture of a construction in which the grooves extend along the support member while passing circumferentially around it for more than one revolution, alternately in one direction and then in the other.

Accordingly, the present invention provides an apparatus for laying an elongate telecommunications transmission member into a groove which extends along the outer surface of a support member while passing circumferentially around the support member for more than one revolution, alternately in one direction and then in the other, the apparatus comprising: a laying station for the transmission member and a storage station for supply of the transmission member disposed upstream from the laying station along a passline for the support member; a fixed storage position for the transmission member in the storage station; positioning means for the transmission member disposed between the laying and storage stations, the positioning means having a guide surface spaced radially from the passline for guiding the transmission member as it moves from the storage to the laying stations; a laying means disposed in the laying station, the laying means having a guide passage for guiding the transmission member received from the positioning means into the groove of the support member, the laying means having unlimited rotational movement around the passline; and a shielding tube means for the support member, the shielding tube means surrounding the passline and extending along the passline between the fixed positioning means and the laying means.

The apparatus according to the invention is useful for laying elongate telecommunications transmission members whether these are optical fibers, electrical conductors, or structures of tubes containing optical fibers. In a preferred arrangement, the apparatus is for laying a plurality of the transmission members into a plurality of grooves of the support member. For this purpose, there are a plurality of fixed storage positions in the storage station, the positioning means has a plurality of guide surfaces which are spaced apart around the passline, and the laying means has a plurality of guide passages spaced apart around the passline for guiding the transmission members received from the positioning means into the grooves of the support member.

In a preferred arrangement, the apparatus comprises an alignment device surrounding the passline and spaced upstream from the laying means but downstream from the positioning means. The alignment device has unlimited rotational movement around the passline, has an alignment passage axially aligned with the guide passage in the laying means, and means for rotating the alignment device together with the laying means to ensure continued axial alignment between the alignment and guide passages.

Also in a practical construction, the positioning means comprises an angularly adjustable positioning device and a positioning device upstream from the adjustable device. This adjustable positioning device is provided for the purpose of adjusting the angular position of each of the transmission members at a certain point along its feedpath. This is particularly useful in practical situations where it is found that because of manufacturing techniques, the positions for directional changes in the grooves precess around the support member from position to position. The adjustable positioning device is movable to compensate for this precession so as to prevent undue twisting of the transmission members around the shielding tube means.

According to the invention also there is provided a method of laying an elongate telecommunications transmission member into a groove which extends along the otter surface of a support member while passing circumferentially for more than one revolution around the support member, alternately in one direction and then the other, the method comprising: passing the support member along a passline through a laying station; passing the transmission member to the laying station from a fixed storage position in a storage station upstream from the laying station along the passline for the support member; in the laying station, laying the transmission member into the groove by rotation of the transmission member for more than one complete revolution around the passline of the support member, alternately in each direction, said rotation causing the transmission member to twist around the support member alternately in each direction; and preventing the transmission member, when twisted around the support member, from contacting the support member by supporting the transmission member upon the outer surface of a tube which surrounds and shields the support member upstream from the laying station.

In a preferred method, the transmission member is aligned axially with the support member as the transmission member approaches the laying station and this alignment is maintained during rotation of the transmission member around the support member in the laying station.

Embodiments of the invention will now be described, by way of example, with reference to the accompanying drawings, in which:

FIG. 8 is a side elevational view similar to FIG. 3 and showing the apparatus in one stage of use;

FIG. 9 is a view similar to FIG. 8 showing the apparatus in a different stage of use.

Figure 1:
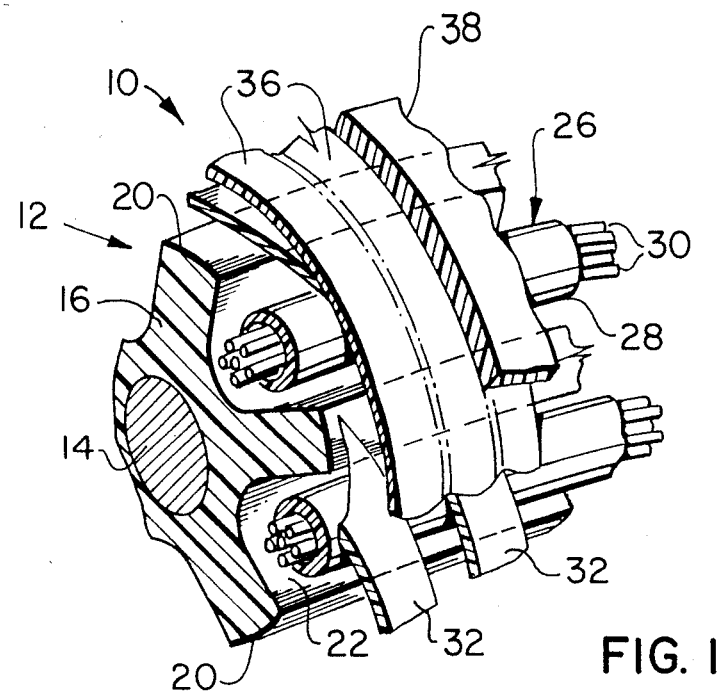
FIG. 1 is an isometric view, partly in section, of an optical cable having elongate transmission members located in grooves of a support member.
Figure 2:
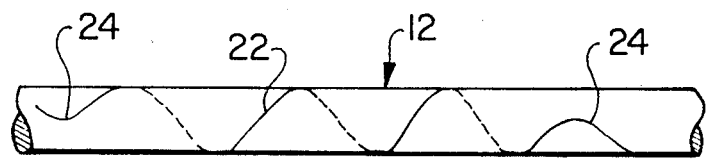
FIG. 2 is a side elevational view, on a scale smaller than that of FIG. 1, showing the path followed by one of the grooves of the support member.

In FIG. 1 is shown the structure of an optical cable in the manufacture of which apparatus to be described below is to be used. The optical cable 10 comprises a central support member 12 which consists of a flexible metal or fiberglass tensile member 14 and a surrounding extruded plastics cover 16 for the tensile member. As can be seen from FIG. 1, the cover 16 is formed with ribs 20 which extend basically in an axial direction of the support member, the ribs 20 defining between them grooves 22 in the surface of the support member. As shown by FIG. 2, each of these grooves extends along the outer surface of the support member while passing circumferentially for more than one revolution around the support member alternately in one direction and then in the other. FIG. 2 is a diagrammatic view merely illustrating part of the path of one of the grooves 22. As can be seen from FIG. 2, the grooves each extend for approximately three revolutions in one direction around the support member and then at positions 24, change direction to extend around the support member for approximately three revolutions in the other direction. Each of the grooves 22 houses an elongate telecommunications transmission member 26 (FIG. 1) which is in the form of a plastics tube 28 surrounding a plurality of optical fibers or waveguides 30. Around the support member is applied a conventional binding tape 32, a conventional metal shield 34 formed with corrugations 36 and an outer surrounding jacket 38 of polymeric material such as PVC or polyethylene.

The embodiment is concerned with an apparatus and a method of manufacture for laying the transmission members 26 into the grooves.

Figure 3:
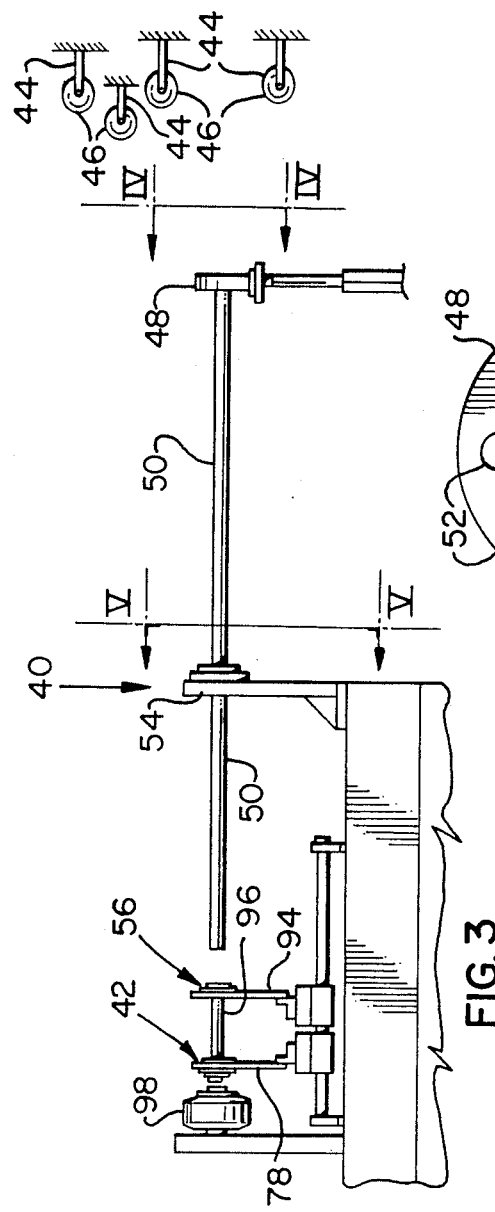
FIG. 3 is a side elevational view, on a much reduced scale, of apparatus for laying the transmission members into the grooves of the support member in FIG. 1.
Figure 4:
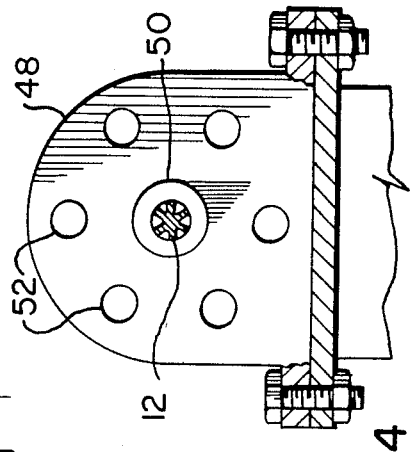
FIGS. 4 and 5 are cross-sectional views, on a much larger scale than FIG. 3, taken along lines IV—IV and V—V in FIG. 3.

As can be seen from FIG. 3, this apparatus 40 has a laying means 42 disposed in a laying station and upstream from this is located a storage station in which is disposed a plurality of fixed storage positions 44 for the members 26. As seen from FIG. 3, each of the storage positions is filled with a reel 46 containing an indefinite length of a transmission member 26.

Downstream from the storage station 44 is disposed a positioning means for the transmission members as they are fed from the storage towards the laying stations.

This positioning means comprises a fixed positioning device comprising a fixed plate 48 having a substantially central orifice within which is secured an upper end of a tube 50. The tube 50 provides a shielding tube means for the support member 12 which, in use, is to pass through the tube so that the tube surrounds and extends along the passline of the support member. The fixed plate 48 is formed with a plurality of guide surfaces for guiding the transmission members from the storage station around the outside of the tube 50 and axially of the passline for the support member. These guide surfaces are formed by guide bores 52 which are equally spaced apart on a pitch circle around the tube 50 so as to locate the transmission members in substantially equally spaced positions around the passline. As can be seen from FIG. 3, the tube 50 extends from the positioning means 48 and through an angularly adjustable positioning device 54 (to be described) of the positioning means. The tube then extends further downstream to a position short of an alignment device 56 which is also to be described.

Figure 5:
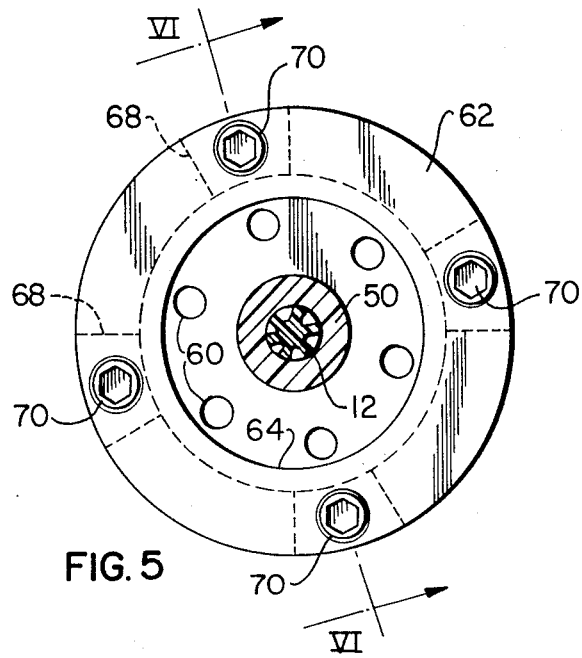
Figure 6:
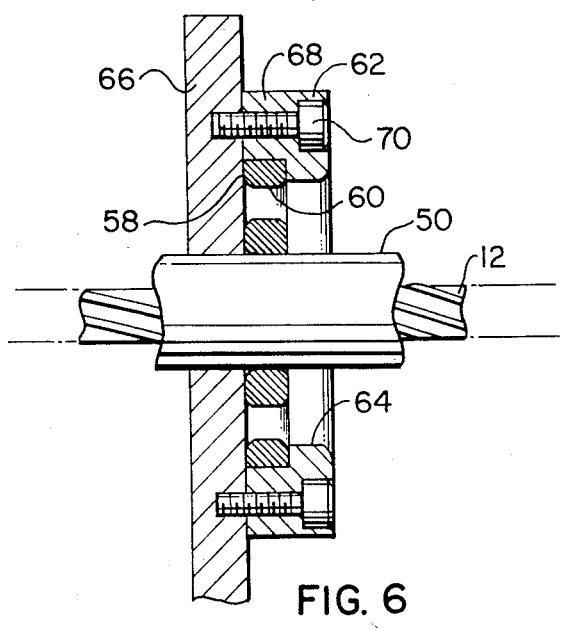
FIG. 6 is a cross-sectional view of part of the apparatus taken along line VI—VI in FIG. 5.

As can be seen from FIGS. 5 and 6, the angularly adjustable positioning device 54 comprises an annular guide plate 58 which is also formed with guide bores 60 spaced apart around the tube 50 in a manner similar to that described for the member 48. The guide plate 58 may be locked securely in any angular position, or released therefrom for angular adjustment around the tube, by means of a locking plate 62 which is also annular and is formed with a large central aperture 64 to form clearance for the transmission members passing through the guide bores 60. The locking plate 62 sandwiches the annular guide plate against a stationary frame 66 and the locking plate has four short annular flanges 68 which are equally spaced apart around it and extend radially outside the annular guide 58 towards the frame member 66. Extending through holes in these flanges are locking pins 70 which secure the locking plate directly to the frame member 66 as shown in FIG. 6. As can be seen, the annular guide plate 58 may be rendered stationary or movable by tightening or loosening the screws 70 as the case may be.

Figure 7:
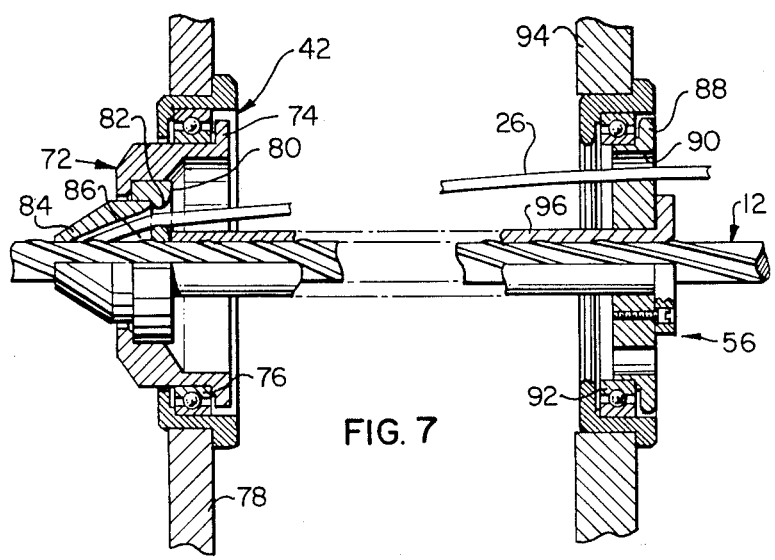
FIG. 7 is a side elevational view, partly in cross-section, and to the scale of FIGS. 4 to 7, of a combined laying means and alignment device of the apparatus.

The alignment device 56 is part of an assembly with the laying means 42. This is clearly seen from FIG. 7. The laying means 42 comprises a rotatable head 72 formed basically in two parts. A first part comprises an annular guide plate 80 secured within a housing 74 which is rotatably mounted by a bearing 76 in a stationary frame 78. The guide plate 80 comprises guide passages 82 equally spaced apart around the feedpath for holding the transmission members in spaced apart positions as they move towards the filament. The second part of the laying means comprises a frustoconical member 84 which is held by the guide plate 80 and together with the guide plate 80 defines an open space 86 downstream from passages 82. The space 86 becomes annular around the support member 12 when this is being fed along its passline. The structure of the plate 80 and member 84 is discussed in greater detail in copending U.S. patent application Ser. No. 102,990 by C. A. Akre entitled "Layering of A Tube Containing Transmission Elements Onto A Support Filament" and filed concurrently with this application.

The alignment device comprises a guide plate 88 provided with equally spaced apart alignment passages 90 around the feedpath and this plate is rotatably mounted by a bearing 92 within a frame member 94. It is intended that each of the alignment passages 90 should be axially aligned with one of the guide passages 82 in the laying head 72 during the laying operation. To ensure that there is continued axial alignment between these two sets of passages, a means is provided for rotating the alignment device and the laying means together. This rotating means comprises a driving tube 96 which surrounds and extends along the passline between the laying means and the alignment device. This tube 96 is secured at its downstream end to the guide plate 80 and at its upstream end to the plate 88 so that a rigid structure between the laying head and the plate 88 results.

In use of the apparatus, the support member 12 is fed from an upstream end (right-hand side of FIG. 8) through the tube 50 and then through the tube 96. The support member then continues out through the laying head and through a core wrap applying means 98 of conventional construction, before proceeding to further conventional processes involved with the manufacture of the cable. After passing through the binding head 98, at which the binder tape 32 is applied in conventional fashion, the sub-assembly of support member, transmission members 26, and the binding tape may either proceed immediately to a stage for applying the shield 36 and jacket 38 or may be reeled for storage before proceeding on those further process steps.

As the support member 12 proceeds along its feedpath through tubes 50 and 96, the transmission members 26 are passed from their reels 46 and through the guide bores 52 of the fixed plate 48. The transmission members 26 then proceed through the guide bores 60 of the adjustable positioning device before continuing through the alignment passages 90 of the alignment device, the guide passages 82, and into the grooves formed in the support member.

As the transmission members are laid into the grooves and as the support member moves continuously through the laying head, then the grooves 22 progress circumferentially around the support member first in one direction and then in the other. This movement is followed by the laying head which is rotated by the tubes 30 passing into the grooves. The tubes 30 have sufficient strength to move the laying head without the laying head requiring direct movement from the support member itself. As can be seen, the laying head must also rotate for three revolutions in each direction so as to follow the groove movement and align the guide passages 82 substantially with the grooves 22 to enable the laying process to take place. This rotational movement is transmitted to the alignment device 88 through the tube 96 so that axial alignment of the transmission members with the support member is ensured from the alignment device to the laying means. During the rotational movement for three revolutions in each direction of the laying means and alignment device, substantial rotation of the transmission members must take place between the adjustable positioning device 54 and the alignment device 56. However, this twisting operation in each direction does not cause any contact between the transmission members and the support member so that any damage resulting from such contact is avoided. Between the adjustable positioning device 54 and the alignment device 56, each of the transmission members twists around the tube 50 and contacts the tube for a major part of the revolution of the laying head in each direction. The tube 50 has a smooth outer finish so that the transmission members merely slide across it as they twist around it while moving along their feedpaths towards the alignment device whereby no deterioration is caused either to the tube or to the transmission members. Thus, the embodiment shows that with apparatus according to the embodiment, transmission members may be laid into grooves of a support member when these grooves extend alternately in one direction and then the other for more than one revolution. In this particular case, as has been discussed, the grooves extend for approximately three revolutions in each direction.

Obviously the transmission members should not be twisted tightly around the tube 50 and the maximum number of revolutions that the laying head and alignment device may rotate is dependent upon the length of tube 50 around which the transmission members may twist.

Figure 10:
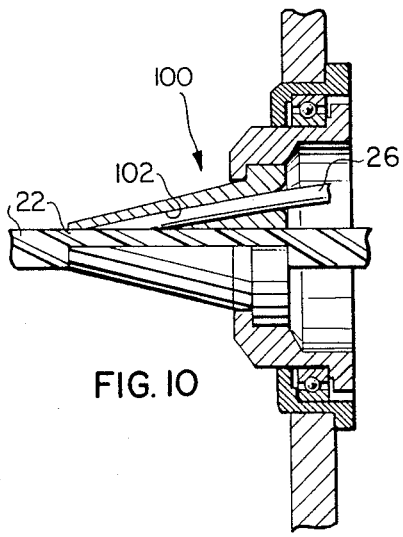
FIG. 10 is a side elevational view, partly in section of a laying means in a modification of the embodiment.

As can be seen from FIG. 8, the annular guide plate 58 is disposed in such a position that the transmission members 26 have a slight twist between the plate guide 48 and the adjustable positioning means. Upon start up of the apparatus, it would be preferable for the transmission members 26 to pass between the fixed and adjustable positioning devices with negligible twist. However, as the laying process continues, if the grooves do not extend angularly for the same distance in each direction around the support member then a precession of the grooves takes place around the support member. To enable the laying head to move in the direction of the precession without tightening the transmission members upon the tube 50, then the adjustable positioning device provides a compensation. This compensation is permitted by loosening the annular guide plate 58 and rotating it slightly in the direction of the precession, from time-to-time, and then fixing it in a new position so that a negligible change in twist caused by the precession takes place downstream from the adjustable positioning device. Of course, such an adjustment to the position of the annular guide plate 58 results in a slight twist in the transmission members between the fixed and adjustable positioning means, as shown by FIG. 8. Clearly the degree of twist between the fixed positioning device 48 and the adjustable positioning device 54 does not alter unless for when the annular guide plate 58 is rotated. This is clear from FIGS. 8 and 9 which show two stages in the laying procedure. As shown in FIGS. 8 and 9, the direction of twist of the members 26 around tube 50 and downstream from the adjustable device 54, changes when the direction of rotation of the alignment device 56 and laying head 72 changes. However, the direction of twist upstream from the adjustable device 54 does not change. The apparatus and method according to the invention do not rely specifically on the use of a laying head such as laying head 72 described in the embodiment. For instance, the laying head may be of a construction which is more conventional. This is shown by FIG. 10 wherein in a modification of the embodiment, a laying head 100 has spaced passages 102 extending obliquely down towards the passline for movement of the transmission members 26 directly into the grooves 22. In this case, the open space 86 is avoided.

The apparatus described in the embodiment (FIG. 1 to 9) and the accompanying method are both useful only for applying transmission members in the form of tubes containing optical fibers into grooves of the support member. This is because of the construction of laying head with the open space 86. However, the invention is intended to be used for location of other transmission members, such as twisted pairs of conductors or individual fibers or bunches of fibers (not contained within tubes) into grooves of a support member. For this purpose, in a further modification of the embodiment (not shown), the laying head is of a construction similar to that of FIG. 10, with spaced passageways 102. The laying head of the further modification also has groove locating projections which extend towards the passline and into the grooves of the support member. As the support member moves through the laying head and the grooves move angularly around the feedpath at the laying station, then the grooves move the groove locating projections and thus the laying head around the support member so as to align the guide passages of the laying head with the grooves to enable laying of the transmission members to take place. This type of laying head is described for instance in U.S. Pat. No. 4,483,134, granted Nov. 20, 1984. That particular patent does refer in fact to a limitation to the angular movement of the laying head around the feedpath. It should be remembered that in this present invention and in the modification to the embodiment now being discussed, the laying head has unlimited rotational movement around the feedpath and is not subject, therefore to the angular movement limitation of the above patent.

What is claimed is:

1. Apparatus for laying an elongate telecommunications transmission member into a groove which extends along the outer surface of a support member while passing circumferentially for more than one revolution around the support member, alternately in one direction and then in the other, the apparatus comprising:
    a laying station for the transmission member and a storage station for supply of the transmission member disposed upstream from the laying station along a passline for the support member;
    a fixed storage position for the transmission member in the storage station;
    positioning means for the transmission member disposed between the laying and storage stations, the positioning means having a guide surface spaced radially from and non-rotatable around the passline for guiding the transmission member as it moves from the storage to the laying stations;
    a laying means disposed in the laying station, the laying means having a guide passage for guiding the transmission member, received from the positioning means into the groove of the support member, the laying means having unlimited rotational movement around the passline; and
    a shielding tube means for the support member, the shielding tube means surrounding the passline and extending along the passline between the fixed positioning means and the laying means, the shielding tube means having a cylindrical outer surface which extends unimpeded for the whole length of the tube as a support surface for the transmission member.

2. Apparatus according to claim 1 for laying a plurality of elongate telecommunications transmission members into a plurality of grooves which extend along the outer surface of the support member while passing circumferentially for more than one revolution around the support member alternately in one direction and then in the other, the apparatus including:
    a plurality of fixed storage positions in the storage station;
    the positioning means has a plurality of guide surfaces spaced apart around the passline for guiding the transmission members in spaced positions as they move towards the laying station; and the laying means has a plurality of guide passages spaced apart around the passline for guiding the transmission members received from the positioning means into the grooves of the support member.

3. Apparatus according to claim 1 provided with an alignment device surrounding the passline and positioned upstream from the laying means, the alignment device having unlimited rotational movement around the passline, having an alignment passage axially aligned with the guide passage in the laying means, and means for rotating the alignment device together with the laying means to ensure continued axial alignment between the alignment and guide passages.

4. Apparatus according to claim 3 wherein the rotating means comprises a driving tube surrounding the passline and extending between and secured to both the laying means and the alignment device.

5. Apparatus according to claim 1 wherein the positioning means comprises an angularly adjustable positioning device and a fixed positioning device upstream from the adjustable device.

6. A method of laying an elongate telecommunications transmission member into a groove which extends along the outer surface of a support member while passing circumferentially for more than one revolution around the support member alternately in one direction and then in the other, the method comprising:

passing the support member along a passline through a laying station;

passing the transmission member to the laying station from a fixed storage position in a storage station, located upstream from the laying station along the passline for the support member;

in the laying station, laying the transmission member into the groove by rotation of the transmission member for more than one complete revolution around the passline of the support member, alternately in each direction, said rotation causing the transmission member to twist around the support member alternately in each direction; and preventing the transmission member, when twisted around the support member, from contacting the support member by supporting the transmission member upon and along the whole length of the unimpeded outer surface of a tube which surrounds and shields the support member upstream from the laying station.

7. A method according to claim 6 wherein the support member is formed on its outer surface with a plurality of grooves which extend along that surface while passing circumferentially for more than one revolution around the support member, alternately in one direction and then in the other, said method comprising passing a plurality of transmission members to the laying station while positioning the transmission members laterally spaced apart around the support member, and laying the transmission members into respective grooves of the support member by rotation of all of the transmission member for more than one complete revolution in each direction while twisting them around and supporting them upon the tube.

8. A method according to claim 6 comprising aligning the transmission member axially with the support member as the transmission member approaches the laying station and maintaining the axial alignment during rotation of the transmission member around the support member in the laying station.

* * * * *